Figure 1:
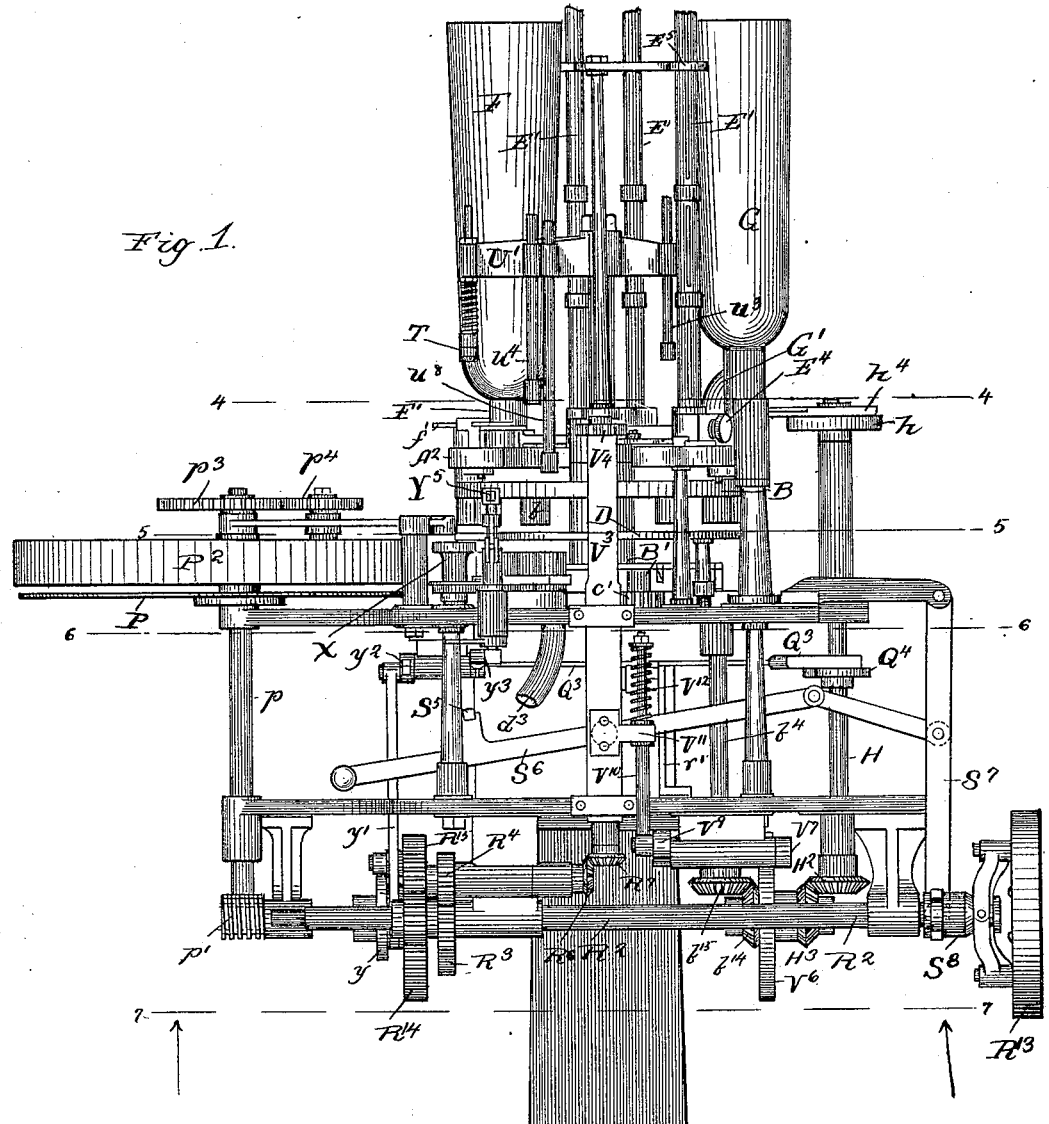

(No Model.) 12 Sheets—Sheet 2.
W. B. PEARSON, G. D. PHELPS & E. W. BLATCHFORD.
CARTRIDGE LOADING MACHINE.
No. 464,987. Patented Dec. 15, 1891.

(No Model.) 12 Sheets—Sheet 4.

W. B. PEARSON, G. D. PHELPS & E. W. BLATCHFORD.
CARTRIDGE LOADING MACHINE.

No. 464,987. Patented Dec. 15, 1891.

(No Model.) 12 Sheets—Sheet 5.

W. B. PEARSON, G. D. PHELPS & E. W. BLATCHFORD.
CARTRIDGE LOADING MACHINE.

No. 464,987. Patented Dec. 15, 1891.

Witnesses:
Geo. C. Curtis
H. W. Munday

Inventors:
Walter B. Pearson
George D. Phelps
Eliphalet W. Blatchford
By Munday, Evarts & Adcock,
Their Attorneys.

(No Model.) 12 Sheets—Sheet 6.
W. B. PEARSON, G. D. PHELPS & E. W. BLATCHFORD.
CARTRIDGE LOADING MACHINE.

No. 464,987. Patented Dec. 15, 1891.

Witnesses:
Geo. C. Curtis
A. M. Munday.

Inventors:
Walter B. Pearson
George D. Phelps
Eliphalet W. Blatchford
By Munday, Evarts & Adcock
Their Attorneys.

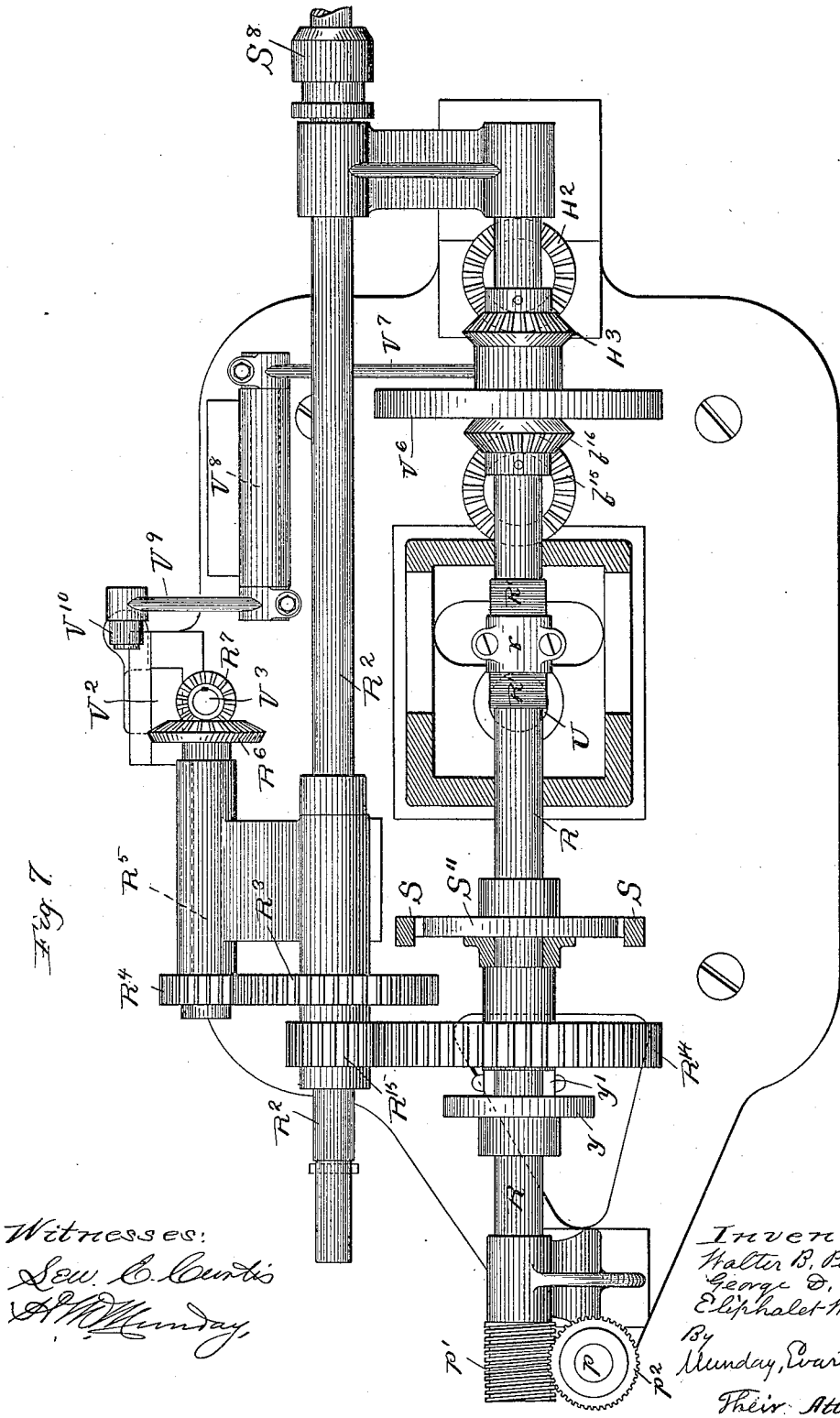

(No Model.) 12 Sheets—Sheet 8.
W. B. PEARSON, G. D. PHELPS & E. W. BLATCHFORD.
CARTRIDGE LOADING MACHINE.
No. 464,987. Patented Dec. 15, 1891.
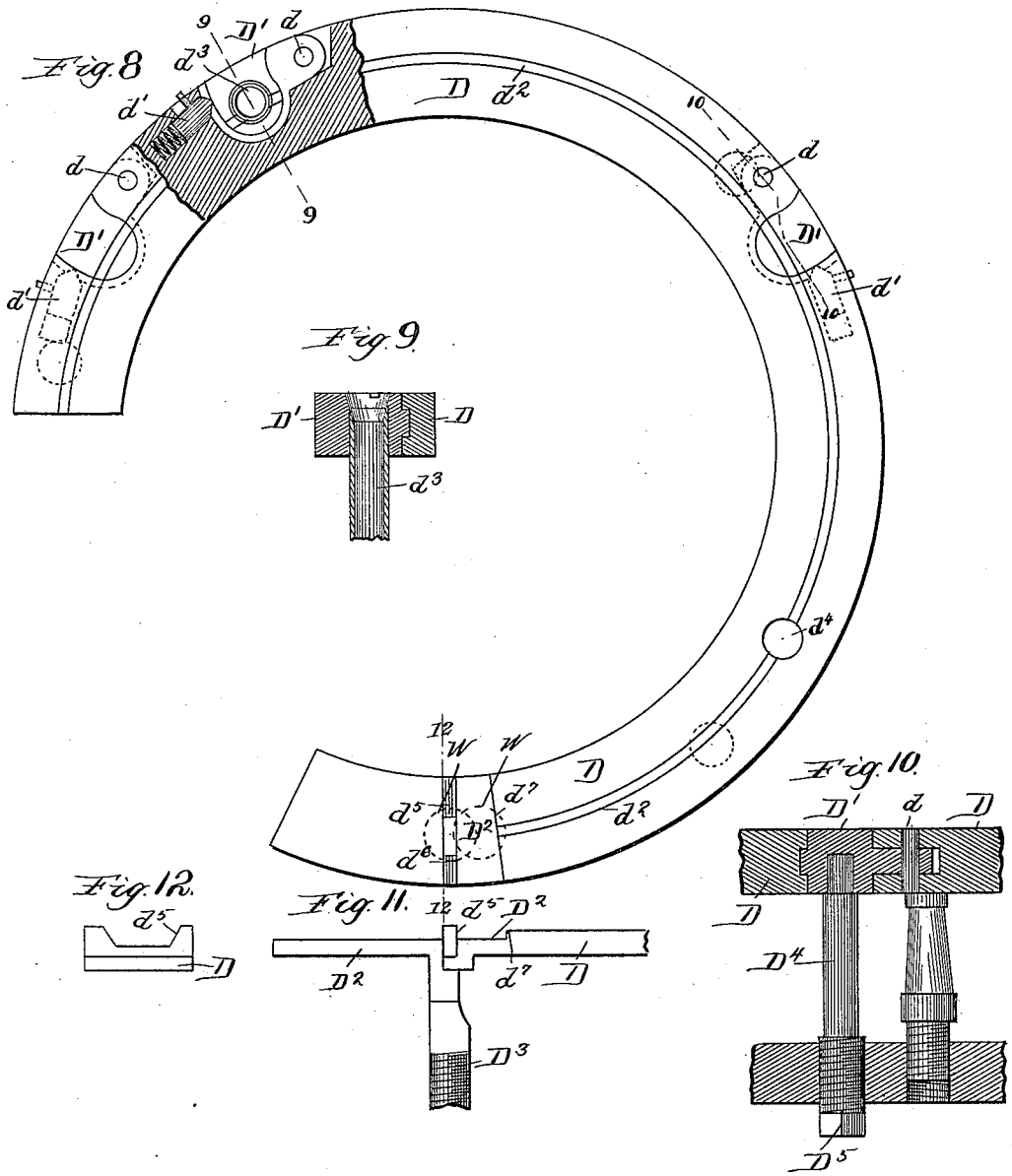

(No Model.) 12 Sheets—Sheet 9.
W. B. PEARSON, G. D. PHELPS & E. W. BLATCHFORD.
CARTRIDGE LOADING MACHINE.
No. 464,987. Patented Dec. 15, 1891.
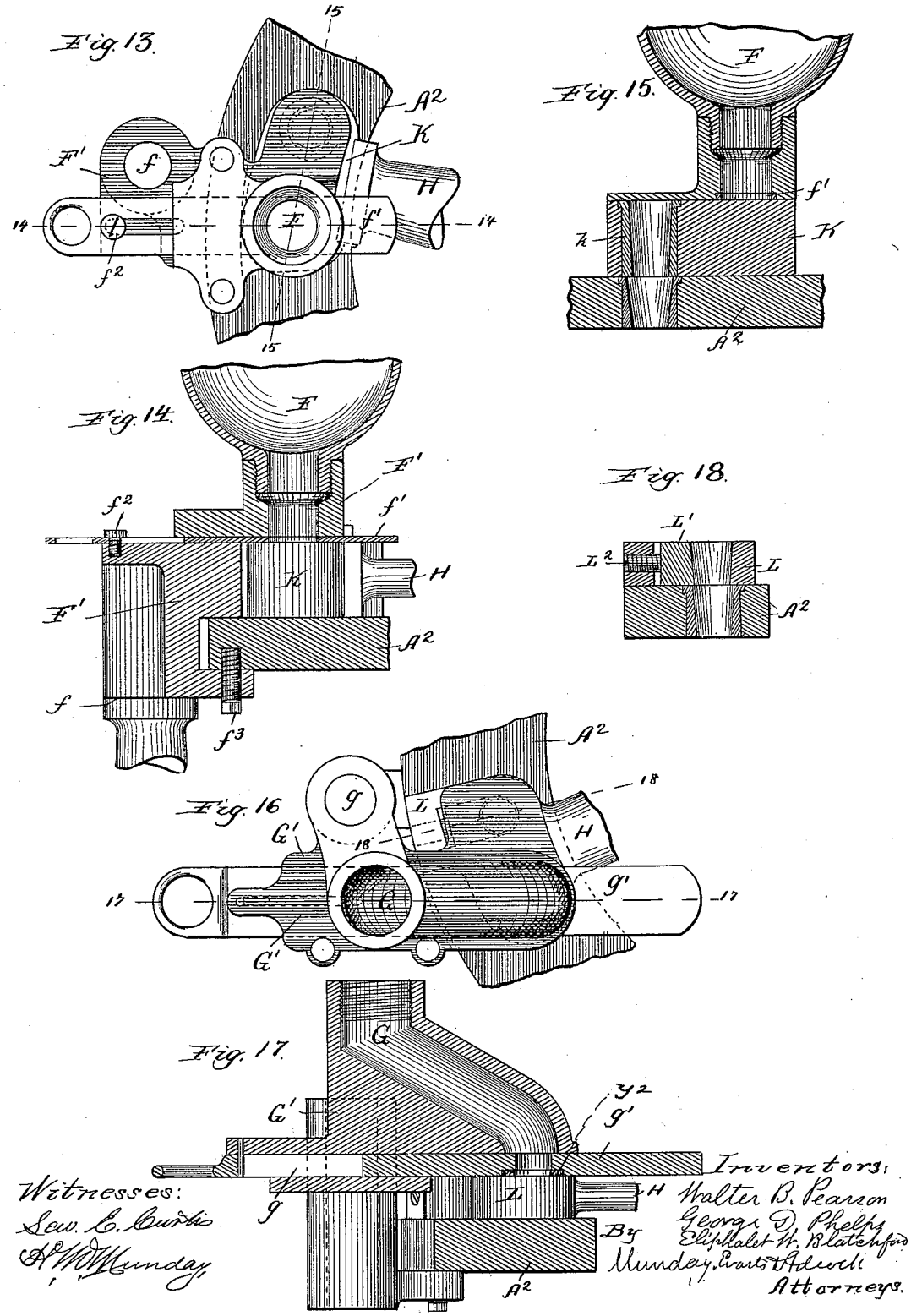

(No Model.) 12 Sheets—Sheet 10.
W. B. PEARSON, G. D. PHELPS & E. W. BLATCHFORD.
CARTRIDGE LOADING MACHINE.
No. 464,987. Patented Dec. 15, 1891.
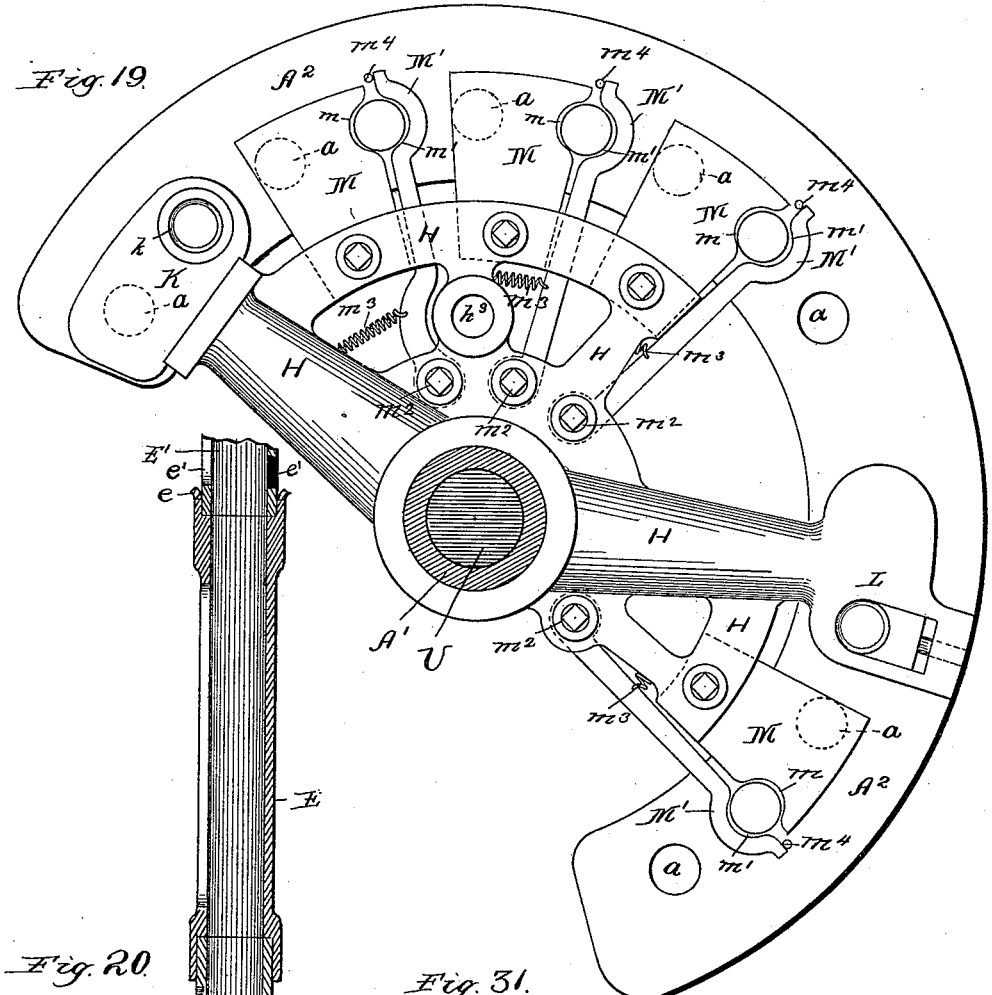
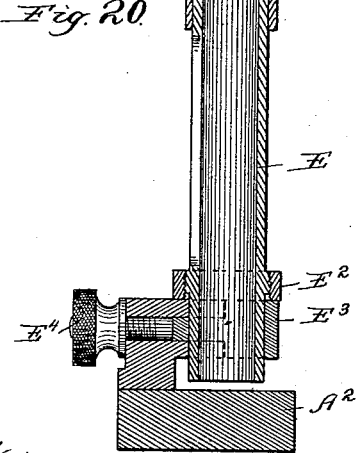
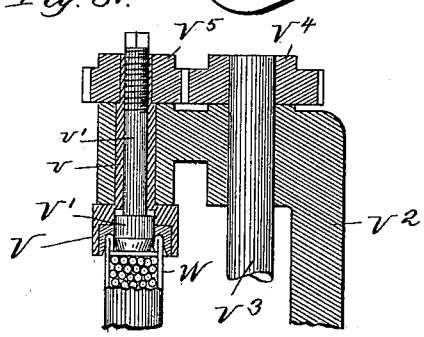

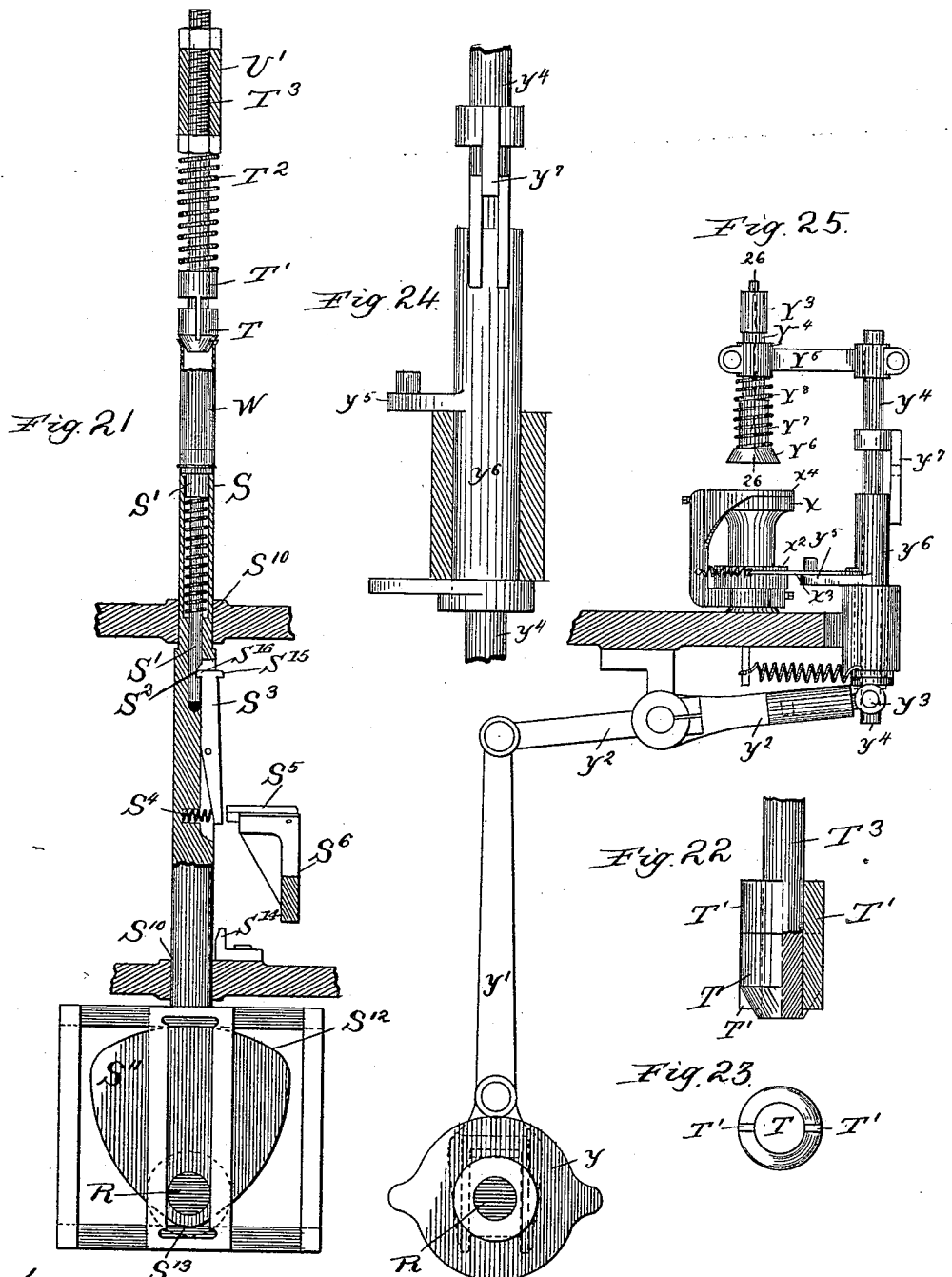

(No Model.) 12 Sheets—Sheet 12.
W. B. PEARSON, G. D. PHELPS & E. W. BLATCHFORD.
CARTRIDGE LOADING MACHINE.
No. 464,987. Patented Dec. 15, 1891.
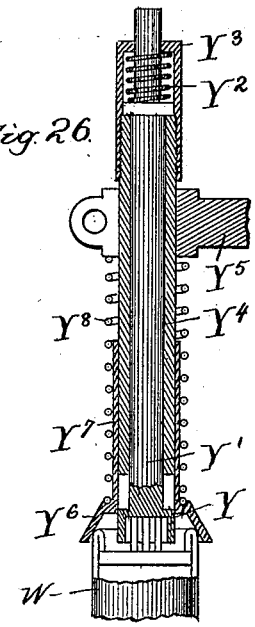
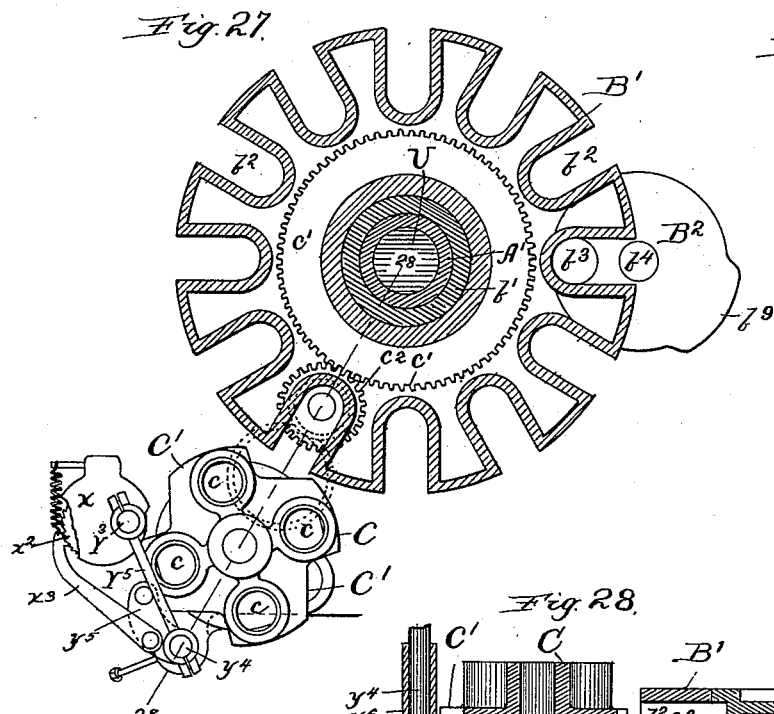
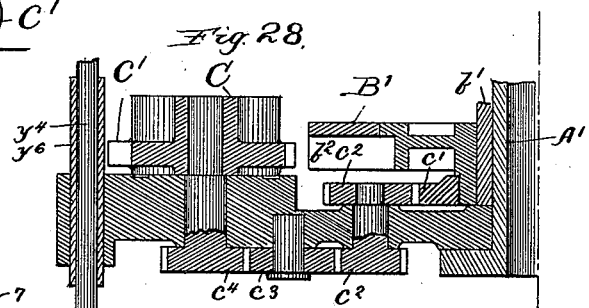
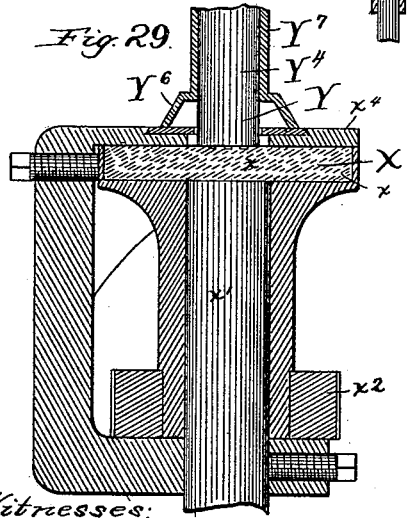
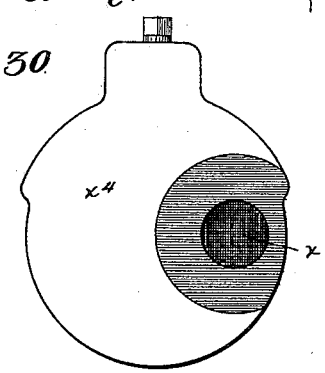

UNITED STATES PATENT OFFICE.

WALTER B. PEARSON, GEORGE D. PHELPS, AND ELIPHALET W. BLATCHFORD, OF CHICAGO, ILLINOIS, ASSIGNORS TO SAID BLATCHFORD.

CARTRIDGE-LOADING MACHINE.

SPECIFICATION forming part of Letters Patent No. 464,987, dated December 15, 1891.

Application filed May 14, 1891. Serial No. 392,690. (No model.)

*To all whom it may concern:*

Be it known that we, WALTER B. PEARSON, GEORGE D. PHELPS, and ELIPHALET W. BLATCHFORD, citizens of the United States, residing at Chicago, in the county of Cook and State of Illinois, have invented a new and useful Improvement in Cartridge-Loading Machines, of which the following is a specification.

This invention relates to improvements in cartridge-loading machines, and more particularly to certain improvements upon the cartridge-loading machine heretofore patented in Letters Patent Nos. 389,221 and 389,385, granted to E. W. Blatchford as assignee of C. C. Hill, and both dated September 11, 1888.

The object of the present invention is to simplify the construction and operation of the machine, and to produce an efficient and durable machine, all the parts of which will co-operate together with the requisite certainty and without liability to wear or get out of adjustment, by which the cartridges may be loaded with uniformity, and by which all danger of accidents may be avoided.

A further object is to provide a machine that may be conveniently and easily operated at any desired speed, from which defective or other shells may be removed when partially loaded or after having entered the machine, and to provide safeguards against spilling powder or shot over the moving parts of the machine.

The invention consists in the novel devices and novel combinations of parts and devices herein shown and described, and more particularly pointed out in the claims.

Figure 2:
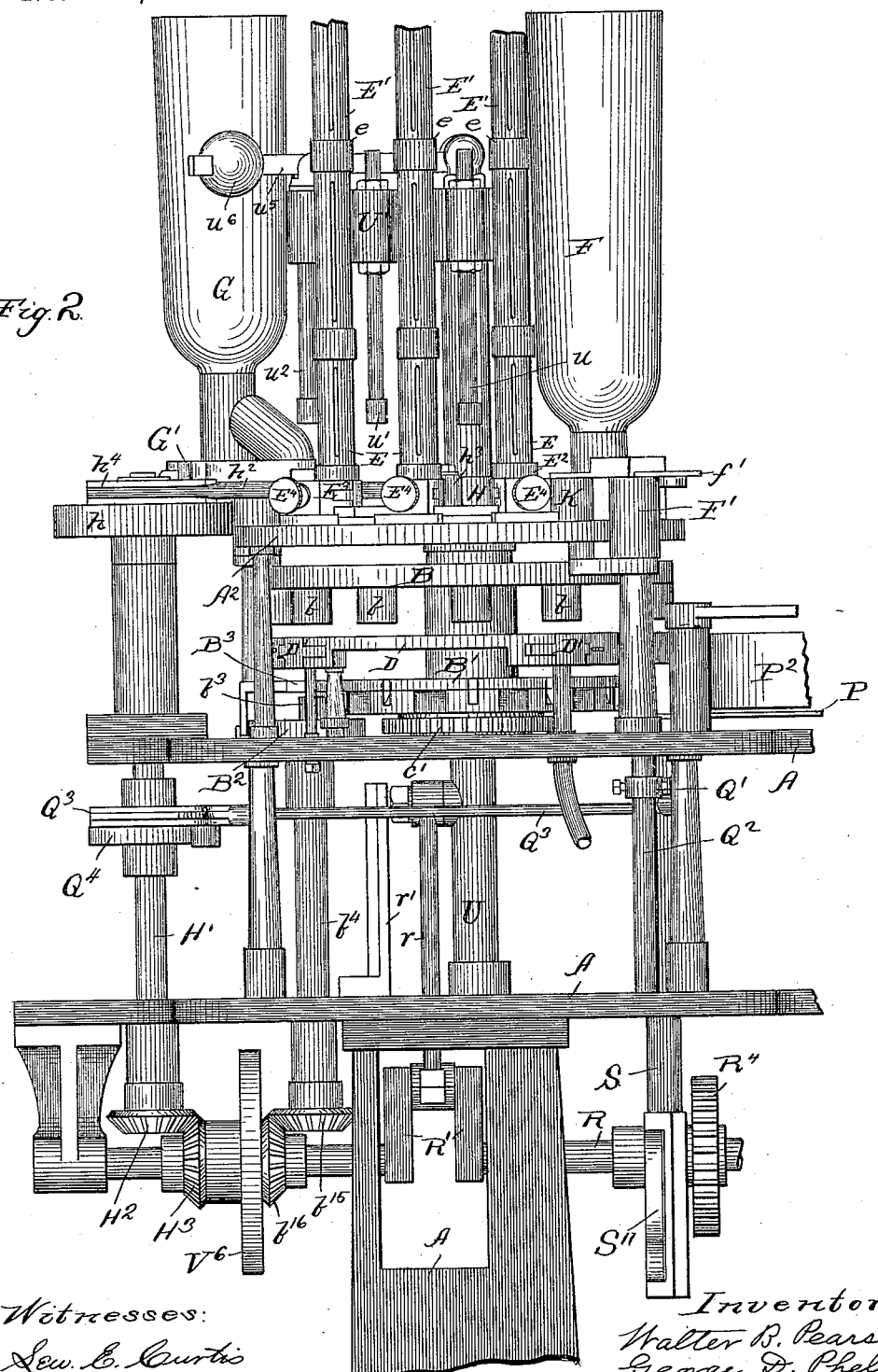
Figure 3:
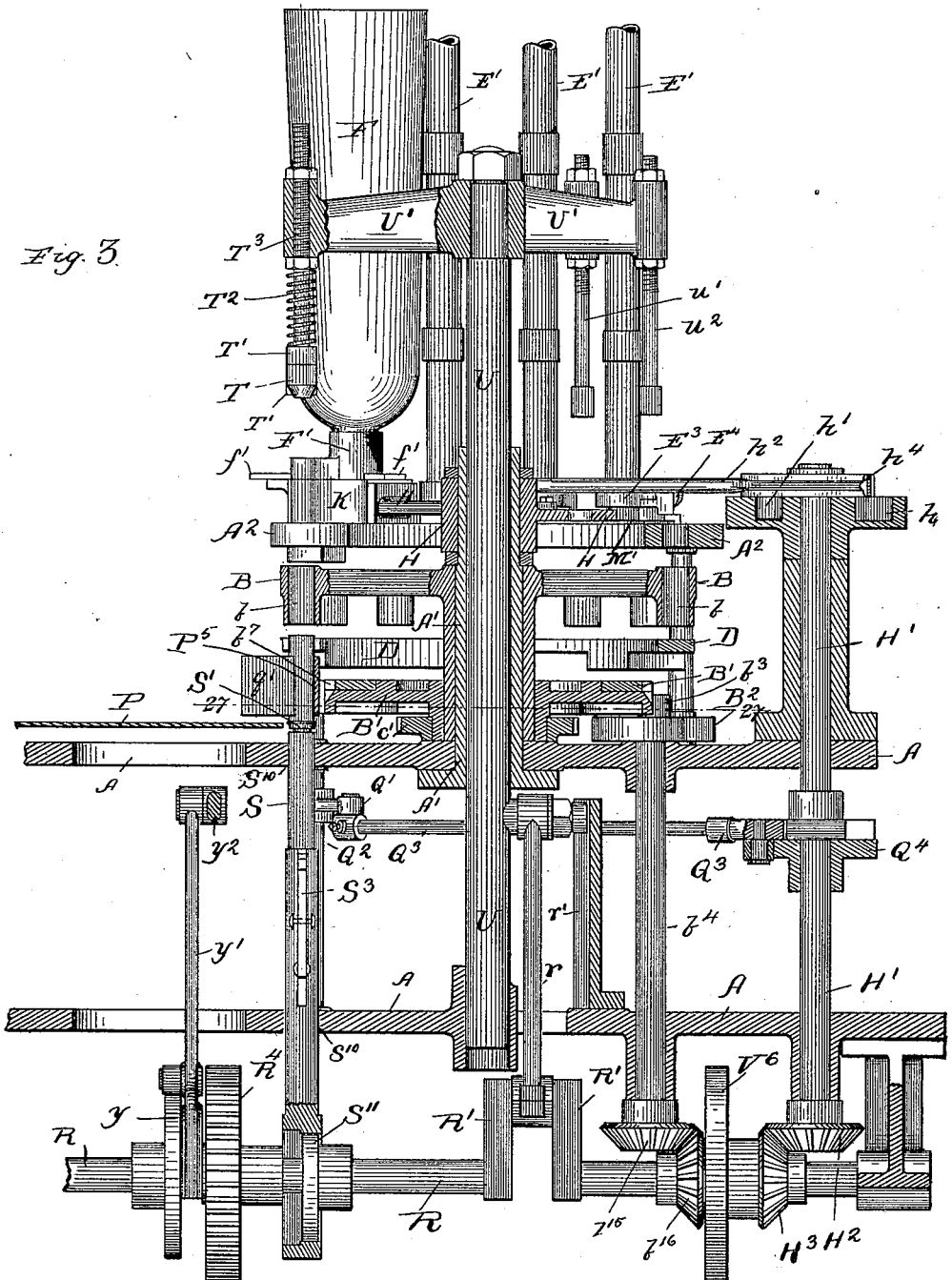
Figure 4:
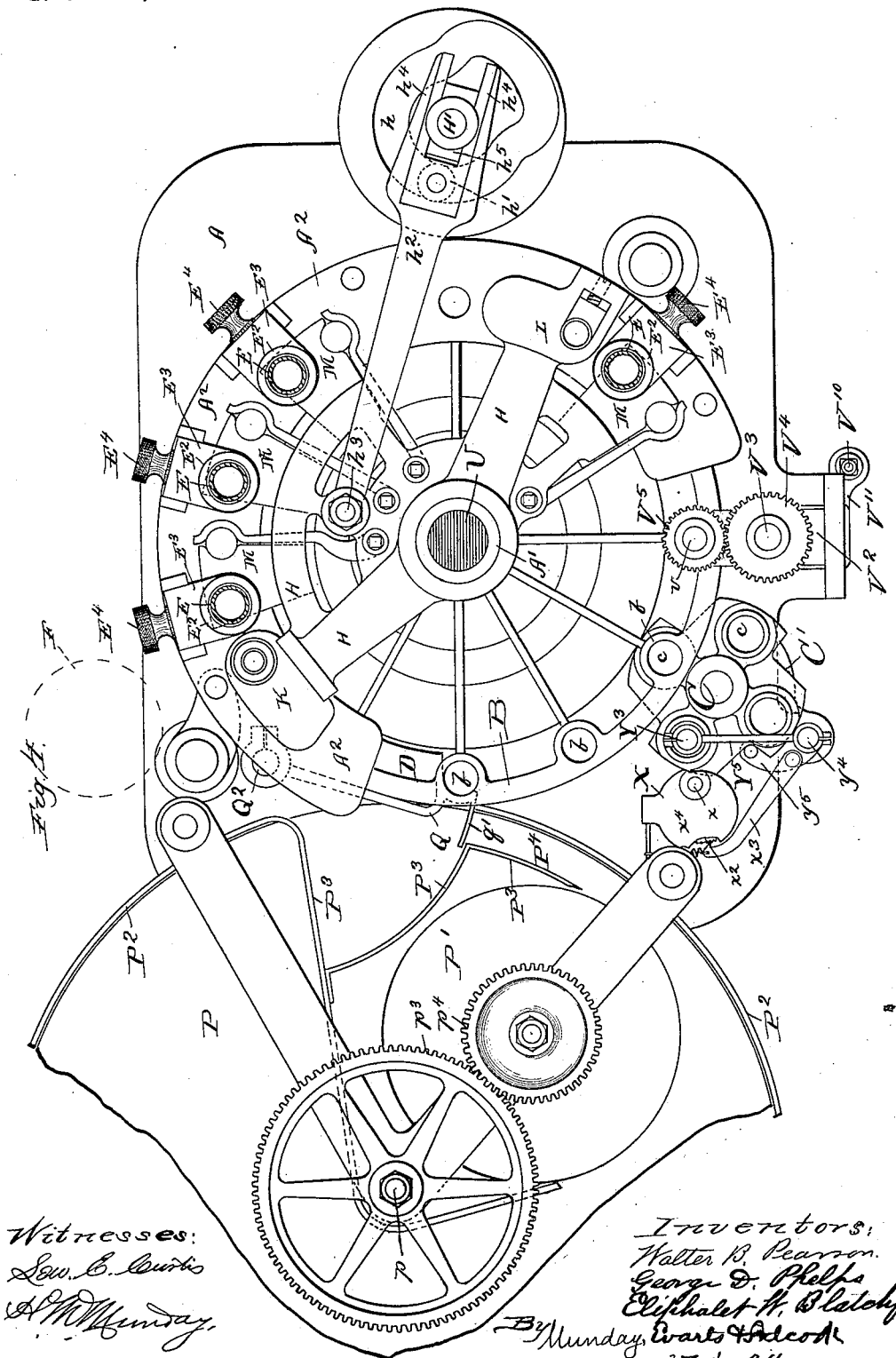
Figure 5:
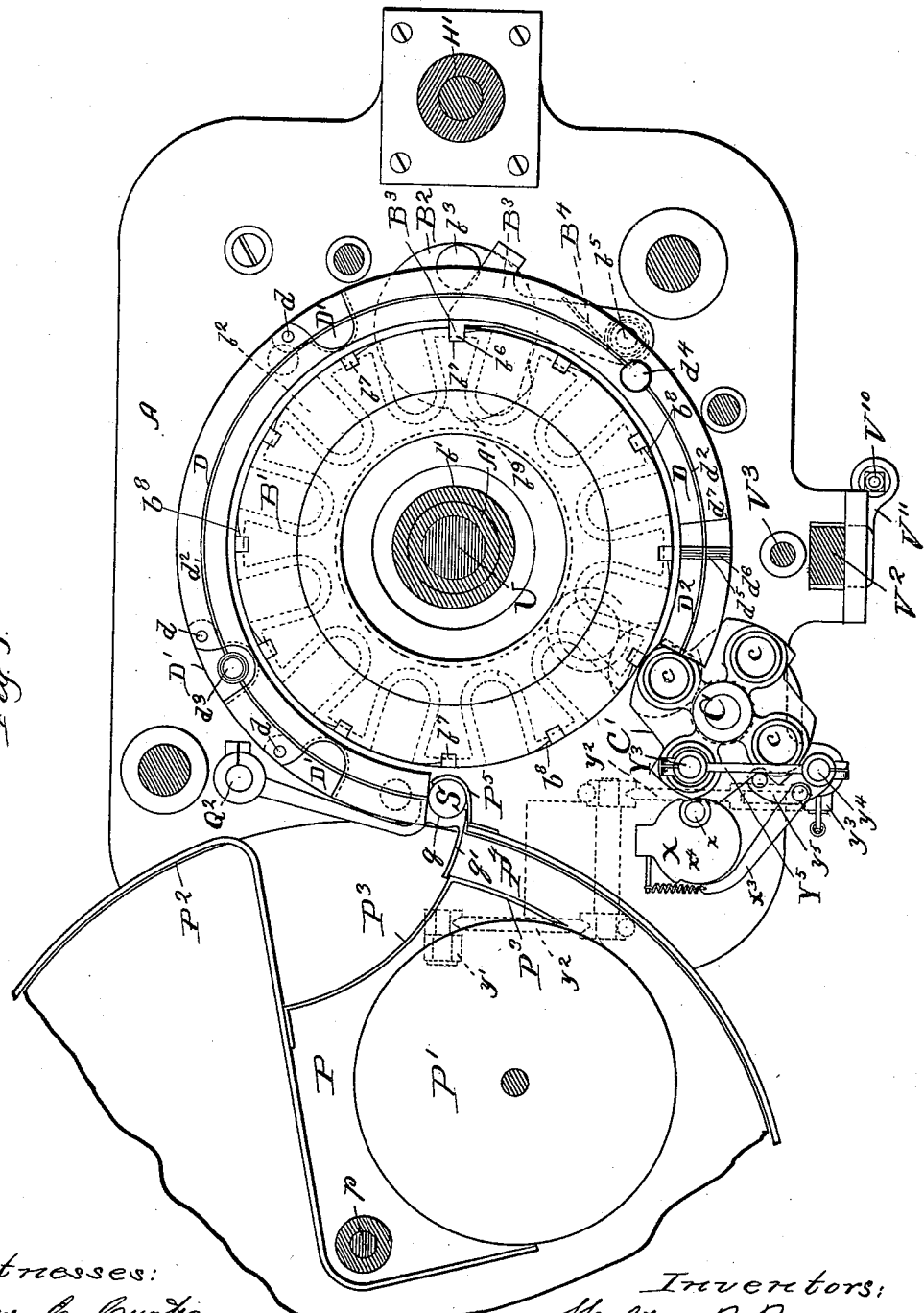
Figure 6:
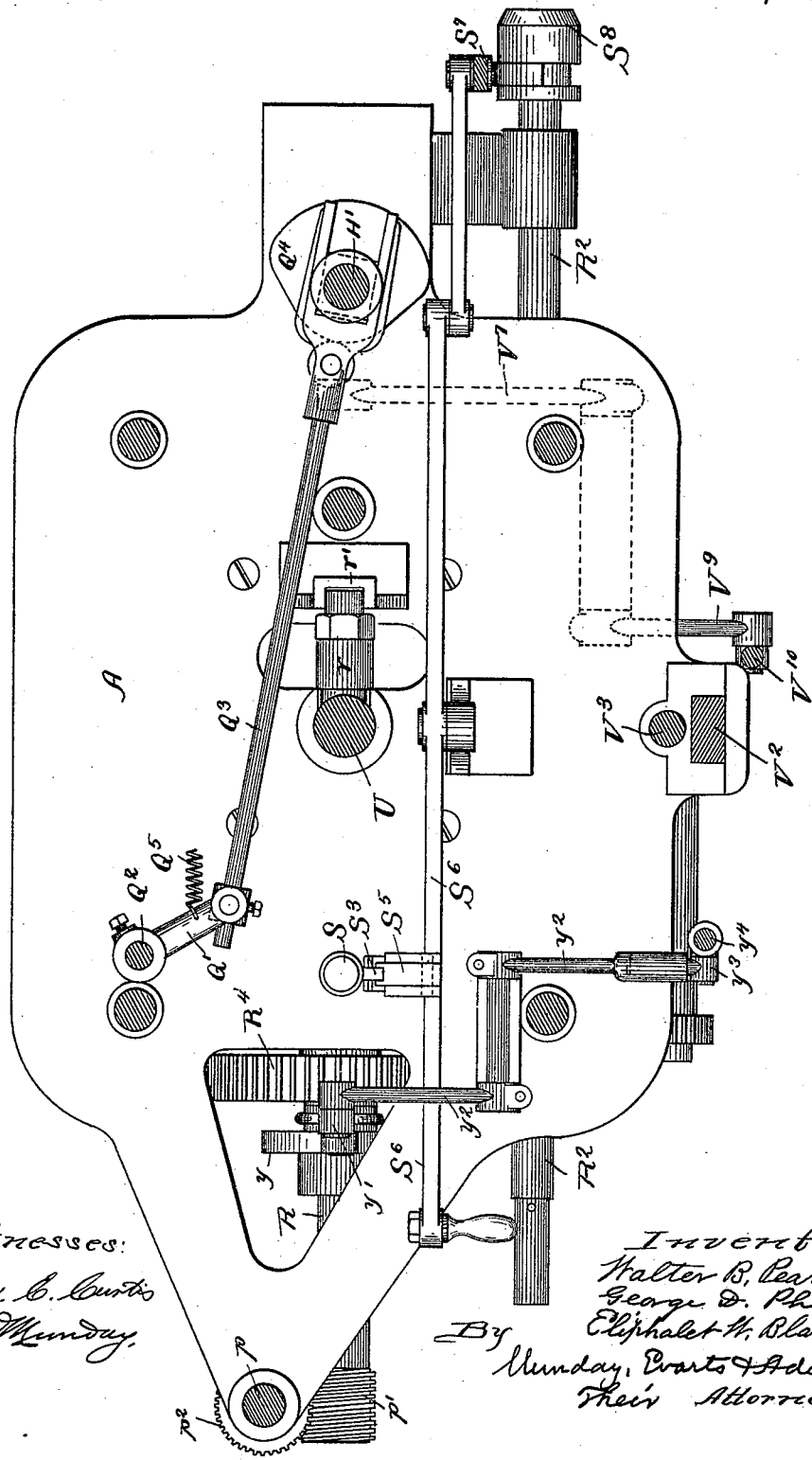

In the accompanying drawings, which form a part of this specification, and in which similar letters of reference indicate like parts, Figure 1 is a side elevation of a machine embodying my invention. Fig. 2 is a like elevation showing the opposite side from Fig. 1. Fig. 3 is a central vertical longitudinal section. Fig. 4 is a horizontal section on line 4 4 of Fig. 1, showing a plan of many of the parts. Fig. 5 is a similar horizontal section on line 5 5 of Fig. 1. Fig. 6 is a similar horizontal section on line 6 6 of Fig. 1. Fig. 7 is a bottom view looking from line 7 7 of Fig. 1. Fig. 8 is a detail plan of the track around or on which the shells are carried. Fig. 9 is a cross-section on line 9 9 of Fig. 8. Fig. 10 is a section on line 10 10 of Fig. 8. Fig. 11 is a partial side view showing that portion of the track where the shell-holder of the crimper is located. Fig. 12 is an end view of the track and shell-holder, looking from line 12 12 of Fig. 8. Fig. 13 is a detail plan view of the powder-holder. Fig. 14 is a section on line 14 14 of Fig. 13. Fig. 15 is a section on line 15 15 of Fig. 13. Fig. 16 is a detail plan view of the shot-holder. Fig. 17 is a section on line 17 17 of Fig. 16. Fig. 18 is a section on line 18 18 of Fig. 16. Fig. 19 is a detail plan view showing the wad-feeders. Fig. 20 is a vertical section of one of the wad-holders. Fig. 21 is a detail elevation of the elevator or feed-plunger mechanism by which the shell is lifted or fed into the cell of the carrier. Figs. 22 and 23 are detail views of the spreader device which serves to spread or round the mouth of the shell. Fig. 24 is a detail view of the marker device. Fig. 25 is a detail elevation of the marker. Fig. 26 is an enlarged section of the marker on line 26 26 of Fig. 25. Fig. 27 is a horizontal section on line 27 27 of Fig. 3, showing the turret movement. Fig. 28 is a section on line 28 28 of Fig. 27. Fig. 29 is a vertical section of the inker device. Fig. 30 is a plan of the inker, and Fig. 31 is a vertical section of the crimper.

In the drawings, A represents the frame of the machine.

B is an intermittently-revolving shell-carrier having, preferably, twelve cells or holes $b$ to receive the shells. The carrier B is journaled on a hollow stud $A'$ in the frame of the machine. It is revolved intermittently (see Figs. 3 and 27) by means of an index-wheel $B'$, secured to the hub $b'$ of the carrier B and furnished with slots or grooves $b^2$, extending, preferably, radially, which are engaged by a roller or projection $b^3$ on a continuously-revolving wheel $B^2$. The axis or shaft $b^4$ of the wheel $B^2$ is on the circumference of the index-wheel $B'$, so that the roller or projection $b^3$ will both enter and leave the radial slot $b^2$ in a tangential line or path, thus both starting the index-wheel $B'$ gradually and slowly and stopping its movement before or as the roller leaves the slot. By this means the carrier B is started and stopped in its step-by-step movement very slowly and gradually and without any jarring strain or blow, while at the same time the carrier is moved quickly during the intermediate portion of each step movement. I thus secure the requisite speed and at the same time produce a smooth and easy movement, avoiding all excessive strain, friction, or jars which might occasion heat and consequent danger owing to the explosive nature of the material—powder—being operated with the machine. The wheel being also positively stopped by this index movement, there is no chance for the momentum of the wheel carrying it beyond its register to cooperate with the other parts of the machine. To secure additional certainty, or as an additional safeguard, I provide (see Fig. 5) a lock-bolt $B^3$, pivoted at $b^5$ to the frame of the machine and having a lug $b^6$, which enters a notch $b^7$ in the wheel $B'$. The front wall $b^8$ of this notch is cut away within the circumference of the wheel $B'$ so that the lock-bolt will necessarily engage each notch as the wheel revolves. The lock-bolt is held against the wheel $B'$ by a spring $B^4$, and is withdrawn from its engagement with the wheel $B'$ by a cam or projection $b^9$ on the driving-wheel $B^2$ of the index movement.

C is the supplemental turret, located tangentially to and underneath the carrier B, and into which the loaded shells are discharged from the carrier B, and by which they are conveyed to the marker, and thence finally discharged from the machine. The turret C (see Figs. 4, 5, and 27) preferably has four cells or holders $c$ to receive the shells, and is revolved intermittently and simultaneously with the carrier B, motion being communicated to it, from the same index movement hereinbefore described, by means of a train of gears $c'$ $c^2$ $c^3$ $c^4$, the gear $c$ being on the hub of the wheel B, and the gear $c^4$ being on the hub of the turret C, and the gears $c^2$ $c^3$ being intermediate. By thus combining the main carrier B and the supplemental turret C with one and the same index movement we secure a certain and definite co-operation and register of the parts.

D is the track upon which the shells rest or ride as they are carried around by the carrier B. This track (see Figs. 2, 3, 5, 8, 9, 10, 11, and 12) is provided with one or more, preferably three, removable sections $D'$ at different points around its periphery and registering with the stops or cell-stations of the carrier B, so that by simply removing or swinging open one of these removable sections a defective or partially-filled shell may be conveniently removed from the machine after it enters the same. This is a matter of great convenience and importance in the operation of this class of machines. The movable sections $D'$ of the track are preferably pivoted or hinged to the track, as at $d$. The track is or should be also provided with a spring latch or pin $d'$ for locking the movable sections in place. The track D is or should be also provided with a circular groove or channel $d^2$ for the primer of the shell. The track D is also provided with a discharge opening or pipe $d^3$, registering with the powder-feed valve, so that in case no shell should be present in the cell of the carrier the charge of powder may be conveyed away and not spilt over the machine. This discharge opening or pipe $d^3$ is preferably in one of the hinged or movable sections $D'$ of the track, as one of these movable sections is preferably located at the position where the powder is fed into the shell. A similar discharge-pipe $d^4$ is located at the shot-feed position to carry away the surplus charge of shot.

E are the wad-holders, (see Figs. 1, 2, and 3,) preferably four in number, three for holding wads to be placed on top of the powder and one for holding wads to be placed on top of the shot, as this is ordinarily as great a number of wads as will be required. F is the powder-holder, and G the shot-holder. These parts are all mounted on the stationary framework of the machine.

H is an oscillating wheel or lever (see Figs. 2, 3, 4, and 19) pivoted on the hollow stud $A'$, and by which the powder-valve K, the shot-valve L, and the wad-feed slides or valves M are all operated, and to which they are all secured. All of these valves slide back and forth on a plate $A^2$, constituting part of the frame-work of the machine and having suitable holes or openings $a$ through the same for the passage of the powder, shot, and wads into the shells W in the cells of the carrier B. All the valves or feed-slides K L M are preferably secured adjustably individually to the valve-operating wheel H, so that their relative position may be adjusted to cause them to properly register with the powder, wad, and shot holders, the holes $a$ in the plate $A^2$, and with the carrier B.

The valve-operating-wheel H is operated or oscillated by means of a cam $h$ on the shaft $H'$, which engages a pin or friction-roller $h'$ on a link $h^2$, which is pivoted at $h^3$ to the valve-wheel H. The link $h^2$ is furnished with a fork $h^4$, which slides on a pivotal block or bearing $h^5$ on the shaft $H'$. The powder-valve K is furnished with a removable thimble $k$, which may be replaced by others of different capacity to regulate the amount of the powder charged, as desired.

The powder-holder F (see Figs. 3, 13, 14, 15, and 19) is furnished with a movable block $F'$, preferably pivoted or hinged at $f$ to the frame, so that the powder holder or magazine may be swung out, as indicated in the dotted lines at Fig. 4, when it is desired to remove the powder from the holder, as is often necessary in the practical operation of the machine in changing from one kind of powder to another. To close the communication between the powder-holder and the powder-valve K, the hinged block $F'$ is provided with a cut-off slide $f'$, which may be fixed in place by a set-screw $f^2$. This cut-off slide $f'$ is flush with the upper face of the powder-valve K, so that no powder can be left or spilt on top of the valve when the block or bracket F' and the holder F are swung out. The pivoted block F' is locked in its closed position by a set-screw $f^3$. The shot-holder G (see Figs. 2, 16, 17, 18, and 19) has a similar pivoted block G', hinged at $g$ to the frame of the machine, and furnished with a similar cut-off slide $g'$. This cut-off slide $g'$ is furnished with a leather or other elastic washer $g^2$ to prevent the shot being caught or marred by the shot-valve L.

The capacity of the shot-valve L (see Fig. 18) is regulated by a movable slide L', which forms one wall of the shot-valve, the position of which may be regulated by a set-screw $L^2$.

The wad-holders E (see Figs. 1, 2, and 20) are all alike, and consist each of a fixed and adjustable section E, furnished with a removable section E', both sections being made of slotted tubing to show the position of the wads therein. The lower fixed and adjustable section E is secured adjustably by a screw-threaded collar $E^2$, which fits against the bracket $E^3$, attached to the plate $A^2$. By turning the threaded collar $E^2$ the space between the lower end of the tube E and the plate $A^2$ may be adjusted to correspond to the thickness of the wads. The section E is secured fixedly in position by a set-screw or thumb-screw $E^4$. The section E of the wad-holder is preferably made about a foot in length, so that it will contain a sufficient supply of wads to feed the machine while the longer and removable section E' is being removed and refilled or replaced by another similar filled section. The top or removable section E' fits in a beveled or flaring socket $e$ at the upper end of the section E', and is held in place by a forked spring-clamp $E^5$, attached to the frame of the machine at the top. To afford means for supporting the supply of wads in the section E' as it is being carried and replaced on the section E, we furnish the section E' at or near its lower end with opposite openings $e'$ $e'$ for the thumb and finger to project through and engage the wads. This in practice is a matter of considerable convenience and saves time. The wad-feed slides or valves M (see Fig. 19) are all alike, and consist of a plate adjustably secured to the valve-operating wheel H and having a semicircular pocket $m$ to receive the wad and provided with a spring clamp-arm M', furnished with a similar semicircular pocket $m'$. The wad-clamp arms M' are pivoted at $m^2$ to the wheel H, and are held normally closed by springs $m^3$. The wad-clamp arms M' are opened at the wad-receiving position by striking against a pin or projection $m^4$ on the plate $A^2$.

P is a continuously-revolving disk (see Figs. 1, 4, and 5) upon which the shells to be fed to the machine are placed on end, and which, in conjunction with the oppositely-revolving feed-roller P', a stationary rim or guard $P^2$, secured to the frame, and the inside guide-rim $P^3$, forming the shell-feed passage $P^4$, operates to feed the shells to the feed-gate Q.

The shaft $p$ of the shell-feed disk P (see Figs. 1, 2, 3, 4, 5, and 7) is revolved slowly by means of a worm $p'$ on the main cam-shaft R, which meshes with a worm-wheel $p^2$ on the shaft $p$. The oppositely-revolving feed-roller P' is driven from the shaft $p$ by intermeshing gears $p^3$ $p^4$. The feed-gate Q is furnished with a semicircular pocket $q$ to receive the shell, and with a guard or projection $q'$ to close the feed-passage $P^4$ when the feed-gate lever advances to push a shell over the feed plunger or elevator S. A stationary semicircular guard $P^5$, attached to the rim $P^2$, holds the shell in position to register with the elevator or plunger S. The feed-gate lever Q is oscillated by a crank-arm Q' on the rock-shaft $Q^2$, through the connecting-link $Q^3$ and cam $Q^4$ on the shaft H'. The crank-arm $Q^2$ is furnished with a spring $Q^5$.

The elevator or feed-plunger S (see Figs. 3, 21, 6, and 7) is furnished with a sliding pin S', having a cam-shaped notch $S^2$, which engages a pivoted pawl or lever $S^3$, held in place by a spring $S^4$, and which pawl $S^3$ engages a pawl $S^5$ on the clutch-operating lever $S^6$, through which the clutch-lever $S^7$ and clutch $S^8$ are operated. The operation of this mechanism is such that if no shell is present in position to be pushed up against the spreader T by the elevator or plunger S the pawl or lever $S^3$ will operate the pawl $S^5$ on the clutch-lever, so that the clutch will be disengaged and the machine stopped. If a shell is present on the plunger S, the spring-pin S' will be depressed as the shell is forced against the spreader T, and the pawl $S^3$ moved out of position for engagement with the part $S^5$ of the machine by which it was previously engaged in the contingency before mentioned. When a shell is present, the spring-pin S' is forced down until the projection $S^{16}$ on the spring-actuated pawl $S^3$ slips into the notch $S^2$ in said pin S', and in this position the projection $S^{15}$ on said pawl $S^3$ will pass freely by the pawl or latch $S^5$ on the clutch-lever $S^7$ without engaging the same or stopping the machine. As the plunger S continues to descend the lower end of the pawl-lever $S^3$ will be engaged by a cam stop or projection $S^{14}$ on the frame and the tooth $S^{16}$ removed from the notch $S^2$ in the spring-actuated pin S', thus releasing said pin and permitting it to return to its normal or non-depressed position. Now on the next downstroke of the plunger S, if no shell is present, the spring-pin S' will not be depressed thereby, and the projection $S^{16}$ on the pawl $S^3$ will therefore bear against the unnotched portion of the pin S', and thus hold said pawl outward or in position for engagement of its tooth $S^{15}$ with the pawl or latch $S^5$ on the clutch-lever. On the upstroke of the plunger S the latch $S^5$ on the clutch-lever moves out of the way and immediately returns to place.

The feed plunger or elevator S is reciprocated in its guides $S^{10}$ by a heart-shaped cam $S^{11}$ on the main crank-shaft R. By employing a heart-cam or other cam having a circular portion to operate the feed-plunger, we secure a period of rest for the feed-plunger when the same is in its elevated position to give time for the carrier B to move the shell laterally off the feed-plunger onto the track D before the feed-plunger begins to recede. The cam $S^{11}$, in addition to its circular portion $S^{12}$, has also another circular portion $S^{13}$ to give a similar period of rest to the feed plunger or elevator S at the position where it receives the shell from the feed-gate Q. By thus combining with the shell-carrier B and feed-gate lever Q, both of which move the shell laterally and therefore require a period of rest for the feed plunger or elevator, with a heart-shaped cam having two circular portions for operating said feed-plunger, we cause the parts to co-operate together properly and at the same time secure an easy and smooth movement of the machine without shocks or strains to any of the parts.

U is a reciprocating bar or rod (see Figs. 1, 2, and 3) sliding in the hollow stud A' as a guide, carrying at its upper end a spider U', to which the several wad-rammers $u$ $u'$ $u^2$ $u^3$ are secured, and also the spreader T and shell-extractor plunger $u^4$. The final powder-wad rammer $u^2$, which is the one that is required to exert force or pressure upon the wads, is mounted to slide freely in the spider, and is forced down with a measured pressure by its own gravity and that of the weight $u^6$, mounted thereon, through the pivoted lever $u^5$. The sliding bar or shaft U is reciprocated by a crank R' on the main cam-shaft R, which is connected by a pitman or link $r$ with said slide U.

The spreader T (see Figs. 1, 3, 22, and 23) consists simply of a conical or flaring die or plunger adapted to enter the mouth of the shell and spread or round the same, as required. The conical plunger T is slotted to receive a spring-actuated extractor-slide T', which serves to force the shell off the spreader as the latter is withdrawn by the spider U'. The spring $T^2$, which presses against the extractor T', surrounds the stem $T^3$ of the spreader T.

V is the crimper. The crimper (see Figs. 1, 31, 5, 6, and 7) has the customary hollow, flaring, or curved crimping-face. Its rotary shaft $v$ is hollow, and inside this hollow shaft is an adjustable screw-stem $v'$, carrying a conical plug or tool V', which coacts with the curved face of the crimper V and serves to fold the edge of the shell snugly against its cylindrical wall, as is clearly illustrated in Fig. 31. The conical plug or tool V' of the crimper also serves to hold or press against the wad and insure the retention of the same in a flat or level position on the cartridge.

The rotary crimper V or its shaft $v$ is journaled on a reciprocating bar $V^2$ and is revolved from the splined shaft $V^3$ by the intermeshing gears $V^4$ $V^5$. The reciprocating bar $V^2$ is operated from the main cam-shaft R by a cam R' thereon, which actuates the rock-shaft or lever $V^6$, which is connected to the sliding bar $V^2$. Rotary motion is communicated to the crimper-shaft $V^3$ from the driving-shaft $R^2$ through the gears $R^3$ $R^4$, shaft $R^5$, and bevel-gears $R^6$ $R^7$, the gear $R^7$ being splined to the shaft $V^3$ to permit the necessary movement of the latter.

To hold the shell from turning during the crimping operation, the track D is furnished (see Figs. 12 and 11) with a shell-holder $d^5$ at the crimping position, consisting, preferably, of two inclined or wedge-shaped jaws having longitudinal grooves or teeth $d^6$ cut therein to engage the rim of the shell. These teeth or knives $d^6$ should be sharp, and are preferably inclined like the teeth of a ratchet or of a saw to adapt them to better act against the shell in the direction it is inclined to rotate while being crimped. The portion $D^2$ of the track D where the shell-holder $d^5$ is located is notched or depressed below the general surface of the track D, so that while the holder-jaws $d^5$ project above the track at $D^2$ sufficiently to properly engage the shell, they do not project above the main portion of the track D so as to obstruct the forward lateral movement of the shell along the track and onto and over the holding-jaws $d^5$. The relative position of the holding-jaws in respect to the diameter of the shell and the end $d^7$ of the higher portion of the track D is also such that the front edge of the shell will pass over the holding-jaws $d^5$ before the rear edge of the shell leaves the track D at $d^7$, and such that when the shell is moved centrally over the holding-jaws $d^5$ its rear edge will clear the high portion of the track at $d^7$. This will be clearly understood from Figs. 8, 11, and 12, the dotted circles W W on Fig. 8 indicating two different positions of the shell and serving to illustrate the operation.

The marker Y (see Figs. 25, 29, 26, 27, 28, and 24) is furnished with the necessary type or characters which are desired to be stamped upon the top wad of the cartridge. The marker is carried upon a yielding stem Y', acting against a spring $Y^2$ in the screw-threaded adjustable cap or sleeve $Y^3$, attached to the hollow sleeve $Y^4$ on the operating-arm $Y^5$. The marker is also furnished with a cone-shaped guide $Y^6$, adapted to engage the shell and center the same with the marker, as is clearly indicated in Fig. 26. The flaring guide $Y^6$ is carried by a sliding sleeve $Y^7$, adapted to reciprocate on the sleeve $Y^4$, and held yieldingly in place by a spring $Y^8$. The marker-carrying arm $Y^5$ has a reciprocating and oscillating movement. The oscillating or rotary movement of the marker-arm serves to bring the marker alternately over the shell in the turret C and the ink-pad X, while the reciprocating movement of the marker-arm serves to impress the marker alternately against the inker-pad and the shell in the turret C. The necessary reciprocating movement is imparted to the marker-arm $Y^5$ by a cam $y$ on the shaft R, which, through the connecting-link $y'$, operates a lever $y^2$, connected by a swiveled joint $y^3$ to the lower end of the shaft $y^4$, to which the arm $Y^5$ is rigidly secured. The necessary oscillating or rotary movement is communicated to the marker-arm $Y^5$ by a crank-arm $y^5$ on the sleeve $y^6$, splined to the shaft $y^4$ by a key $y^7$, and which engages a peripheral cam $C'$ on the turret C, by which the shells are carried into position to be marked.

The inker X (see Figs. 29, 30, 25, and 27) consists of a rotary disk furnished with an ink-pad $x$ and journaled upon a shaft $x'$. The shaft $x'$ is provided with a ratchet $x^2$, which is engaged and operated by a pivoted pawl $x^3$ on the arm $Y^5$, so that the pad will continually present a new surface to the marker. Over the inker X is a guard-plate $x^4$ to prevent the guide $Y^6$ from coming in contact with the ink-pad.

W indicates the shell or cartridge to be loaded. The main driving-shaft R has the usual driving-pulley $R^{13}$, and drives the main cam-shaft through the connecting-gears $R^{14}$ $R^{15}$. (See Figs. 1 and 7.)

The operation will be readily understood by those skilled in the art from the foregoing description and drawings. It is briefly as follows: The shells are placed on the shell-feed disk P, and are by the feed mechanism advanced in single file along the feed-passage $P^4$ to the feed-gate Q, which moves the shell over the elevator or feed-plunger S, by which it is raised or lifted into the cell or hole $b$ of the shell-carrier B. The intermittent movement of the carrier B moves the shell forward successively to the several powder-feed, wad-feed, shot-feed, wad-ramming, crimping, and discharge stations. As the shell is discharged from the carrier B it is received in the supplemental turret C and conveyed to the marking-station, and thence after being marked it is discharged from the machine. The shells fit so loosely in the turret C that no discharge-plunger is required or need be employed, though one may be used, and is shown in the drawings (see Fig. 1) at $u^8$, attached to the spider $U'$. The depressed portion $D^2$ of the track is preferably made in a separate piece and independently supported upon an adjustable standard $D^3$, (see Fig. 11,) so that its height may be regulated, as required. Underneath the weighted powder-rammer to properly support the hinged section $D'$ of the track, we provide (see Fig. 10) a standard $D^4$, attached to the hinged section $D'$, the lower end of which rests upon a threaded or adjustable bolt $D^5$. The cam-shaft $H'$, which communicates motion to the valve-wheel H, is driven (see Fig. 2) by gears $H^2$ and $H^3$, the latter being upon the shaft R. Motion is communicated to the shaft $b^4$ of the index driving-wheel $B^2$ by the bevel-gears $b^{15}$ $b^{16}$, the latter being on the main cam-shaft R. (See Fig. 2.) A guide $r'$ on the frame A (see Figs. 2 and 3) serves to prevent the round reciprocating bar or shaft U from turning in its guideway. Motion is communicated to the reciprocating bar $V^2$ of the crimper (see Figs. 3, 6, and 7) by means of a cam $V^6$, lever $V^7$, rock-shaft $V^8$, arm $V^9$, pivoted link $V^{10}$, connected to bracket $V^{11}$ on said bar $V^2$. A spring $V^{12}$ moves the crimper-bar $V^2$ in one direction. The pivoted pawl or lever $S^3$ (see Fig. 21) has a projection $S^{15}$, which engages the pawl $S^5$ when there is no shell in place on the pin $S'$ to depress the same. The spring pawl or lever $S^3$ is returned to place by a stop or projection $S^{14}$ on the frame.

We claim—

1. The combination, with a shell-feed disk P, having outer and inner guide-rims and an interior feed-roller, of a laterally-moving feed-gate Q, an elevator or feed-plunger S, an intermittently-moving shell-carrier B, a powder-holder, shot-holder, and wad-holders, a powder-feed valve, a shot-feed valve, and a series of wad-feed valves or slides, all mounted upon and operated by a common valve-operating wheel H, a reciprocating bar U, carrying a spider $U'$, furnished with a series of rammers or plungers, mechanism for operating said valve-operating wheel H, a radially-slotted index-wheel $B'$, and a driving-wheel $B^2$, furnished with a pin or roller engaging said slots for imparting a step-by-step movement to said carrier B, a rotary crimper mounted on a sliding bar, a supplemental turret C driven from and operating in conjunction with said carrier B, a vibratory and reciprocating marker mechanism, and an inker, all combined and co-operating together, substantially as shown and described.

2. In a cartridge-loading machine, the combination, with an intermittently-moving shell-carrier, of a track furnished with a movable section to permit the removal of shells from the carrier after they enter the machine, substantially as specified.

3. In a cartridge-loading machine, the combination, with intermittently-moving shell-carrier B, having cells $b$ for the shells, of a track D for the shells to ride upon beneath said carrier and provided with a hinged section $D'$ to permit the removal of the shells, substantially as specified.

4. The combination, with intermittently-moving shell-carrier B, having cells $b$ for the shells, of a track D for the shells to ride upon beneath said carrier and provided with a hinged section $D'$ to permit the removal of the shells, said track D being furnished with a catch to hold said hinged section in place, substantially as specified.

5. In a cartridge-loading machine, the combination of the shell-carrier with a track D below the same, furnished with a series of hinged sections $D'$ to permit the removal of the shells at different points, substantially as specified.

6. The combination, with a shell-carrier, of a powder-holder, a powder-feed valve, and a track below said carrier for the shells to rest upon furnished with a discharge opening or pipe normally open and registering with said powder-valve to convey away the charge of powder in case no shell is present in the carrier, substantially as specified.

7. The combination, with an intermittently-moving shell-carrier, of a track beneath the same for the shells to rest upon, furnished with a discharge opening or pipe normally open and registering with the shell-receptacle of the carrier at its ammunition-receiving station to carry away the charge of ammunition in case no shell is present in the carrier, substantially as specified.

8. The combination, with an intermittently-moving shell-carrier, of a track beneath the same for the shells to rest upon, furnished with a discharge opening or pipe to carry away the charge of ammunition in case no shell is present in the carrier, said track having a hinged or movable section and said discharge opening or pipe being in said hinged section, substantially as specified.

9. The combination, with a movable shell-carrier having a series of shell holders or receptacles, of an ammunition-holder and ammunition-feed slide or valve, said ammunition-holder being mounted movably or pivotally on the frame of the machine, so that it may be moved or swung away from its seat to permit the ammunition to be emptied or discharged out of the same, substantially as specified.

10. The combination, with a shell-carrier, of an ammunition-holder and ammunition-feed slide or valve, said ammunition-holder being mounted movably or pivotally on the frame of the machine, so that it may be moved or swung away from its seat to permit the ammunition to be emptied or discharged out of the same, said holder being provided with a cut-off slide to hold the ammunition therein as the holder is being moved out of or into position, substantially as specified.

11. In a cartridge-loading machine, the combination, with an intermittently-moving shell-carrier, of an index-wheel having radial slots and a driving-wheel carrying a pin or roller to engage said radial slots and impart a step-by-step movement to the carrier, substantially as specified.

12. In a cartridge-loading machine, the combination, with an intermittently-moving shell-carrier, of an index-wheel having radial slots, and a driving-wheel carrying a pin or roller to engage said radial slots and impart a step-by-step movement to the carrier, said driving-wheel having its axis at the circumference of said index-wheel, so that its pin or roller will enter and emerge from said slot in a tangential path and thus gradually start the carrier and bring it to a stop gradually, substantially as specified.

13. In a cartridge-loading machine, the combination, with an intermittently-moving shell-carrier, of an index-wheel having radial slots, and a driving-wheel carrying a pin or roller to engage said radial slots and impart a step-by-step movement to the carrier, said driving-wheel having its axis at the circumference of said index-wheel, so that its pin or roller will enter and emerge from said slot in a tangential path and thus gradually start the carrier and bring it to a stop gradually, and a locking-bolt engaging notches in said wheel, substantially as specified.

14. In a cartridge-loading machine, the combination, with shell-carrier B, of index-wheel B', having slots $b^2$, driving-wheel $B^2$, having pin or roller $b^3$, said index-wheel having notches $b^7$, a spring-actuated locking-bolt $B^3$, said driving-wheel $B^2$ having a cam for retracting said locking bolt or lever, substantially as specified.

15. The combination, with an intermittently-moving shell-carrier, of a powder-holder, a shot-holder, a series of wad-holders, a powder-feed valve, a shot-feed valve, a series of wad-feed valves or slides, and a common oscillating wheel or hub H, to which all of said powder, wad, and shot feed valves or slides are carried and by which they are operated, substantially as specified.

16. The combination, with an intermittently-moving shell-carrier, of a powder-holder, a shot-holder, a series of wad-holders, a powder-feed valve, a shot-feed valve, a series of wad-feed valves or slides, and a common oscillating wheel or hub H, to which all of said powder, wad, and shot feed valves or slides are carried and by which they are operated, and a connecting-link and cam for operating said wheel H, substantially as specified.

17. The combination, with an intermittently-moving shell-carrier, of a powder-holder, a shot-holder, a series of wad-holders, a powder-feed valve, a shot-feed valve, a series of wad-feed valves or slides, and a common oscillating wheel or hub H, to which all of said powder, wad, and shot feed valves or slides are carried and by which they are operated, each of said wad-feed slides having a spring-actuated wad-clamp arm M', adapted to engage a stop on the stationary frame-plate of the machine and thus open said clamp-arms at the wad-receiving positions, substantially as specified.

18. In a cartridge-loading machine, the combination, with the shell-carrier B, of slotted index-wheel B', driving-wheel $B^2$, having pin or roller $b^2$, and supplemental shell-carrier turret C, geared directly to said carrier B and moving simultaneously therewith, substantially as specified.

19. In a cartridge-loading machine, the combination, with the shell-carrier B, of slotted index-wheel B', driving-wheel B², having pin or roller b², and supplemental shell-carrier turret C, geared directly to said carrier B and moving simultaneously therewith, and a track D, said turret C being tangential to said carrier B and under said track D, substantially as specified.

20. The combination, with intermittently-revolving shell-carrier turret C, of a reciprocating and oscillating marker, said turret having a cam, and an arm or lever engaging said cam for oscillating the marker, substantially as specified.

21. The combination, with shell-carrying turret C, of a marker and an inker, said marker having an oscillating movement and a reciprocating movement, said turret being furnished with a peripheral cam, and said marker having an operating-lever engaging said cam, substantially as specified.

22. The combination, with a shell-carrying turret C, of a marker and an inker, said marker having an oscillating movement and a reciprocating movement, said turret being furnished with a peripheral cam, and said marker having an operating-lever engaging said cam, and a pawl and ratchet for revolving said inker, substantially as specified.

23. In a cartridge-loading machine, the combination, with a shell-holder, of a marker furnished with a flaring and yielding guide adapted to engage the mouth of the shell as the marker enters the same to impress the wad, and an inker furnished with a shield or protecting-plate to prevent said guide from coming in contact with the ink-pad, substantially as specified.

24. In a cartridge-loading machine, the combination, with a shell-holder, of a marker furnished with a flaring and yielding guide adapted to engage the mouth of the shell as the marker enters the same to impress the wad, and an oscillating and reciprocating arm $Y^5$, upon which said marker is mounted and by which it is operated, and means for oscillating said arm to bring the marker on the shell, and means for reciprocating said arm to force the marker into the shell, substantially as specified.

25. The combination, with shell-carrying turret C, of a marker having a yielding flaring guide $Y^6$, a reciprocating and oscillating arm $Y^5$, upon which said marker is mounted, shaft $y^4$, sleeve $y^6$, splined to said shaft $y^4$, operating-lever $y^5$, a cam on said turret engaging said lever, cam $y$, link $y'$, and lever $y^2$ for reciprocating said shaft $y^4$, all combined and operating substantially as specified.

26. The combination, with shell-carrying turret C, of a marker having a yielding flaring guide $Y^6$, a reciprocating and oscillating arm $Y^5$, upon which said marker is mounted, shaft $y^4$, sleeve $y^6$, splined to said shaft $y^4$, operating-lever $y^5$, a cam on said turret engaging said lever, cam $y$, link $y'$, and lever $y^2$ for reciprocating said shaft $y^4$, said lever $y^5$ having a pawl and said inker being furnished with a ratchet engaging said pawl, all combined and operating substantially as specified.

27. In a cartridge-loading machine, the combination, with a shell-feed gage Q and shell-carrier B, of a reciprocating shell-feed plunger or elevator S, and a cam $S^{11}$ for reciprocating said feed-plunger having two circular portions to give a period of rest to said feed-plunger as the shell is being received from said feed-gate, and as the shell is being moved off the plunger by said carrier, substantially as specified.

28. The combination of shell-feed disk P, its guide-rims $P^2$ and $P^3$ and roller $P'$, with feed-gate Q, shell-carrier B, and heart-cam $S^{11}$ for reciprocating said feed-plunger S, substantially as specified.

29. In a cartridge-loading machine, the combination, with intermittently-moving shell-carrier B, of feed plunger or elevator S, having a yielding seat or pin $S'$, furnished with cam-notch $S^2$, pivoted lever or pawl $S^3$, spring $S^4$, pawl $S^5$, and the clutch and clutch-operating mechanism, substantially as specified.

30. In a cartridge-loading machine, the combination, with shell-carrier B, of track D, having a depressed or recessed portion $D^2$, stationary shell-holder jaws $d^5$, and a rotary crimper, substantially as specified.

31. The combination, with intermittently-revolving shell-carrier B, of feed-plunger S, spring-pin $S'$, pivoted pawl or lever $S^3$, clutch-lever $S^6$, furnished with pawl $S^5$, substantially as specified.

32. The combination, with intermittently-revolving shell-carrier B, of shell-feed plunger S, spring-pin $S'$, pivoted pawl or lever $S^3$, clutch-lever $S^6$, furnished with pawl $S^5$, and a stop $S^{14}$ to return said lever $S^3$ to place at each stroke of the feed-plunger, substantially as specified.

33. In a cartridge-loading machine, the combination, with shell-carrier B, of track D, having a depressed or recessed portion $D^2$, stationary shell-holder jaws $D^5$, and a rotary crimper, said depressed portion $D^2$ of the track having an independently-adjustable support $D^3$, substantially as specified.

34. The combination, with shell-carrier B, of track D, furnished with depressed portion $D^2$ and shell-holder jaws $d^5$, of a revolving and reciprocating crimper V, having inside tool $V'$, sleeve $v$, stem $v'$, reciprocating bar $V^2$, shaft $V^3$, and gears $V^4$ $V^5$, substantially as specified.

35. In a cartridge-loading machine, the combination, with the revolving and reciprocating crimper V, of a reciprocating bar $V^2$, shaft $V^3$, gears $V^4 V^5$, mechanism for reciprocating said bar $V^2$, consisting of a cam $V^6$, lever $V^7$, rock-shaft $V^8$, having arm $V^9$, and pivoted link $V^{10}$, connected to said bar $V^2$, and mechanism for revolving said shaft $V^3$, consisting of driving-shaft $R^2$, gears $R^3$ $R^4$, shaft $R^5$, and bevel-gears $R^6$ $R^7$, said gear $R^7$ being splined to said shaft $V^3$, substantially as specified.

36. The combination, with shell-carrier B, of index-wheel B', having slot $b^2$, driving-wheel $B^2$, having pin or roller $b^3$, and shaft $b^4$, and gears $b^{15}$ $b^{16}$, and a shaft R, substantially as specified.

37. The combination, with shell-carrier B, of a reciprocating shaft or bar U, having spider U', furnished with a series of rammers, shaft R, crank R' thereon, link $r$, and guide $r'$ on the frame of the machine, substantially as specified.

38. The combination, with shell-feed disk P, roller P', and guides $P^2$ $P^3$, of shell-feed-gate lever Q, having pocket $q$ and projection $q'$, crank-arm Q', rock-shaft $Q^2$, connecting-link $Q^3$, and cam $Q^4$ on shaft H, substantially as specified.

WALTER B. PEARSON.
    GEO. D. PHELPS.
    E. W. BLATCHFORD.

Witnesses:
 H. E. JEFFERSON,
 PAUL BLATCHFORD.